(12) United States Patent
Duncan

(10) Patent No.: US 6,829,640 B1
(45) Date of Patent: Dec. 7, 2004

(54) METHOD AND SYSTEM FOR CREATING A BYTE STREAM CHARACTERISTIC NUMBER SUITABLE FOR CHANGE QUANTIFICATION

(75) Inventor: Paul A. Duncan, Apalachin, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/471,346

(22) Filed: Dec. 23, 1999

(51) Int. Cl.[7] .......................... G06F 15/173; H04L 9/00
(52) U.S. Cl. ...................... 709/224; 713/181; 713/187
(58) Field of Search .................. 709/224; 713/181, 713/187

(56) References Cited

U.S. PATENT DOCUMENTS

| | | | | |
|---|---|---|---|---|
| 5,479,654 A | * | 12/1995 | Squibb ........................ | 707/201 |
| 5,542,090 A | * | 7/1996 | Henderson et al. ............ | 707/2 |
| 5,813,007 A | | 9/1998 | Nielsen | |
| 5,842,216 A | * | 11/1998 | Anderson et al. ........... | 707/203 |
| 5,890,164 A | | 3/1999 | Nielsen | |
| 5,898,836 A | * | 4/1999 | Freivald et al. ............. | 709/218 |
| 5,974,574 A | * | 10/1999 | Lennie et al. ................. | 714/52 |
| 5,978,828 A | * | 11/1999 | Greer et al. ................ | 709/224 |
| 6,055,570 A | * | 4/2000 | Nielsen ....................... | 709/224 |
| 6,219,818 B1 | * | 4/2001 | Freivald et al. ............. | 714/799 |
| 6,553,388 B1 | * | 4/2003 | Perks ......................... | 707/201 |
| 6,681,369 B2 | * | 1/2004 | Meunier et al. ............. | 715/511 |

FOREIGN PATENT DOCUMENTS

WO WO 98/35306 * 8/1998

OTHER PUBLICATIONS

Ramabadran, T.V., et al., A Tutorial on CRC Computations, IEEE Micro, vol. 8, No. 4, pp. 62–75, Aug. 1998.*

* cited by examiner

Primary Examiner—Larry D. Donaghue
(74) Attorney, Agent, or Firm—Scully, Scott, Murphy & Presser; John R. Pivnichny

(57) ABSTRACT

A method and system for determining whether first and second byte streams are different. The method and system are very well suited for identifying and approximately quantifying changes to Web sites. Generally, the method comprises the steps of providing a first a k1 byte long sequence of characters $c_i$ for i values from i=1 to k1; providing a second a k2 byte long sequence of characters $c_j$ for j values from j=1 to k2; and computing a modulo arithmetic operation on said i values, and computing said modulo arithmetic operation on said j values. A value N1 is computed according to a formula that combines said modulo operation on i and each said character $c_i$ for i=1 to k1 using arithmetic or logical operations; and a value N2 is computed according to said formula by combining said modulo arithmetic operation on j and each said character $c_j$ for j=1 to j=k2. These N1 and N2 values are then compared to determine whether the first and second byte sequences are different. With the preferred embodiment of this invention, the procedure is used to create a number suitable for detecting and approximately quantifying changes to a byte sequence.

20 Claims, 5 Drawing Sheets

---

Problem: compare and quantify changes to a text
sequence (file, HTML document, etc.) without storing a
copy of the sequence itself.

Checksums have purposes (error correction, change detection), not suited
    for change quantification. Examples:
    ∘Reed-Solomon used for correcting noisy data (MPEG-2, Voyager, etc.)
    ∘TCP segment and IP header checksums use 16-bit checksums only to
    ∘recognize corrupt data.

Message digests used for crypto applications (e.g. digital signatures) give no
    hint to magnitude of change. The following is list of MD5 digests of
    w3.ibm.com main page fetched less than 10 seconds apart:

1796b4ba069717f420ab5b82010a94de
        ff7a564ff53804af42418baf12d794a3
        9c8ce1afd6d4c3eaa16ed2c2b33bfc56

Compression schemes (LZW, Huffman, etc.) are efficient for text but create
    variable-length (sometimes large) result with non-obvious clues about
    magnitude of changes between versions of a text sequence.

FIG. 1

Problem: compare and quantify changes to a text sequence (file, HTML document, etc.) without storing a copy of the sequence itself.

Checksums have purposes (error correction, change detection), not suited for change quantification. Examples:
- Reed-Solomon used for correcting noisy data (MPEG-2, Voyager, etc.)
- TCP segment and IP header checksums use 16-bit checksums only to recognize corrupt data.

Message digests used for crypto applications (e.g. digital signatures) give no hint to magnitude of change. The following is list of MD5 digests of w3.ibm.com main page fetched less than 10 seconds apart:

1796b4ba069717f420ab5b82010a94de
ff7a564ff53804af42418baf12d794a3
9c8ce1afd6d4c3eaa16ed2c2b33bfc56

Compression schemes (LZW, Huffman, etc.) are efficient for text but create variable-length (sometimes large) result with non-obvious clues about magnitude of changes between versions of a text sequence.

FIG. 2

Solution: use a hash function sensitive to character encodings and relative positions within the sequence.

For a character sequence k bytes long, create a hash value, N, such that $$N = \sum_{i=1}^{k} (c_i \text{ XOR } (i \text{ MOD } 256))$$

N has the following properties:
- It is computed efficiently compared to most checksums and message digests
- $N \approx k * 127.5$ (i.e. N is approximately proportional to size of sequence)
- Small content changes will have small effects on N
- Each character operation serves to help transform the relatively narrow distribution of text characters (i.e., tendency for $32 \geq c < 127$ distributed unevenly) to a value with a frequency distribution evenly spread over the range of possible 8-bit sequences (0 - 255).

Using the function against w3.ibm.com after lexical cleansing (removing HTML tags) during the same interval as the MD5 experiment shown previously yields:
257088
257088
256682

FIG. 3

Application: a Web service for subscribers periodically checks Web pages on their "watch list" to determine when to notify them of changes.

Options:
- Notify of any change
- Notify if change is significant (e.g. greater than X% difference in digest numbers or sizes)

Processing:
- A lexical scanner removes HTML tags, comments, and imbedded <script> content using an arbitrary definition of substantive content.
- Remaining text sequence is run through the hash function and compared with previous value.
- Significant differences (whatever the definition) trigger a notification to the user.

Hybrid possibilities:
Add SHA1 or MD5 to reduce chance of function "collisions" (the possible but unlikely case where a combination of changes creates the same N).

METHOD AND SYSTEM FOR CREATING A BYTE STREAM CHARACTERISTIC NUMBER SUITABLE FOR CHANGE QUANTIFICATION

BACKGROUND OF THE INVENTION

This invention generally relates to methods and apparatus for tracking changes to byte streams. More specifically, the present invention relates to methods and apparatus capable of identifying and approximately quantifying changes to Web sites.

More and more consulting services are being delivered via the World Wide Web, and automated tools are being developed to provide-these services. One of these tools allows a client to track competitors by monitoring changes at the competitors' Web sites and notifying the clients of major changes to the sites.

Traditional ways of tracking changes are (1) to store the Web pages off-line and to compare the stored pages to the current pages, and (2) to calculate a number, called a message digest, that represents the document and to use the message digest as the basis for comparison. The second approach is, at least under many circumstances, more appropriate since the first approach requires large amounts of disk space and processing time. Traditional methods of calculating message digests, however, are computationally intensive and have no sensitivity to the content of the document; in fact these methods were designed to be insensitive to content because their primary purpose is to provide a unique identification of, or to "sign," documents and to prevent forgeries. A computationally efficient method of representing the document numerically that is a function of the content of the document is needed to detect the degree of change.

SUMMARY OF THE INVENTION

An object of this invention is to improve methods and apparatus for tracking changes to Web sites.

Another object of the present invention is to provide an improved procedure for detecting and approximately quantifying changes to a Web site.

These objective are obtained with a method and system for determining whether first and second byte streams are different, comprising the steps of providing a first k1 byte long sequence of characters $c_i$ for i values from i=1 to k1; providing a second k2 byte long sequence of characters $c_j$ for j values from j=1 to k2; and computing a modulo arithmetic operation on said i values, and computing said modulo arithmetic operation on said j values. A value N1 is computed according to a formula that combines said modulo operation on i and each said character $c_i$ for i=1 to 1-k using arithmetic or logical operations, and a value N2 is computed according to said formula by combining said modulo arithmetic operation on j and each said character $c_j$ for j=1 to j=k2. These N1 and N2 values are then compared to determine whether the first and second byte sequences are different.

The step of computing the modulo arithmetic operation on the i value may include the step of computing the modulo arithmetic operation on the i values including additional arithmetic and logical bit operations. The step of computing the modulo arithmetic operation on the j value may include the step of computing the modulo arithmetic operation on the j value including additional arithmetic and logical bit operations.

With the preferred embodiment of this invention, the procedure is used to create a number suitable for detecting and approximately quantifying changes to a byte sequence. This procedure is suitable for characterizing arbitrarily large documents in a way suitable for change detection without storing a copy of the document itself. The byte sequence function creates a small number suitable for efficient storage, is computationally efficient, is sensitive to changes in the byte sequence, and is sensitive to the size of the byte sequence. An important advantage of the invention is that the generated number lends itself to methods of arbitrary sensitivity to document changes such as setting clipping levels for changes based on the ratio of the before and after numbers.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIGS. 1–3 outline a procedure embodying the present invention.

DETAILED DESCRIPTION OF THE PREFERRED EMBODIMENTS

With reference to FIGS. 1–3, in the practice of this invention, pages on a Web sites are accessed by any suitable program, such as a program that uses the TCP/IP http protocol, to read the pages. A numeric representation is then calculated for each page as follows:

A byte sequence characteristic number, N, for a byte sequence k characters long is created such that:

$$N = \sum_{i=1}^{k}(c_i XOR(i MOD 256)),$$

where i is the position within the byte sequence and $c_i$ is the ith byte in the sequence.

This function generates a number between 0 and 255 for each byte and is sensitive to the location of the byte in the sequence. Thus, the sequence "ab" will have a different N than the sequence "ba." The sum of all generated 8-bit numbers, N, is approximately equal to 127.5*the size of byte sequence for large sequences. As a result, N is also sensitive to the size of the byte sequence.

If it is desired to recognize only significant changes to a byte sequence, such as a large change to a Web page for example, this can be done by comparing before and after numbers and recognizing changes of more than some arbitrary percent. This heuristic approach is sensitive to content change in smaller byte sequences and is sensitive to size differences in larger byte sequences.

Thus, unlike the messages digest, the procedure of this invention offers an ability to approximately quantify the magnitude of changes to a byte stream.

As described above, the preferred embodiment of the invention is used to detect changes to pages on a Web site.

Is should be noted that the present invention has broader applicability and can be used to detect changes in many types of documents and portions of documents. For example, the invention can be used to detect changes in data files, and in other digital representations of data.

Figure 4:
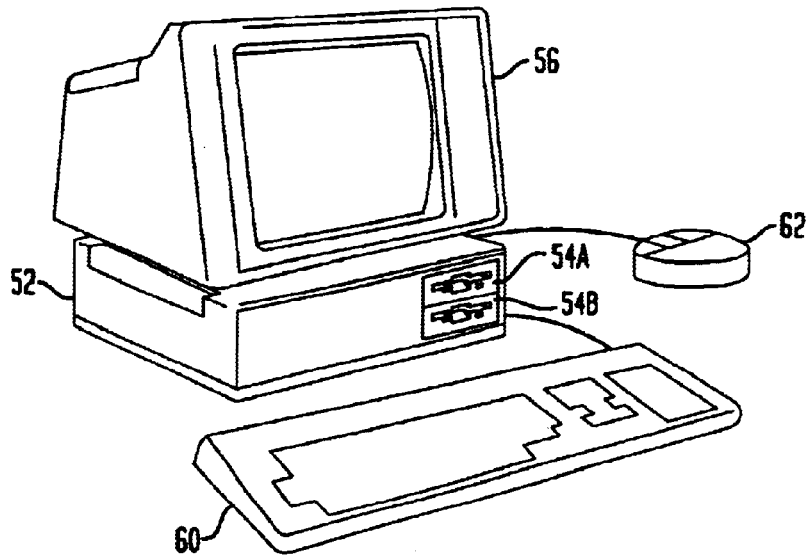
FIG. 4 shows a computer system that may be used to carry out the invention.

FIG. 4 illustrates a computer of a type suitable for carrying out the invention. Viewed externally in FIG. 4, a computer system has a central processing unit 52 having disk drives 54A and 54B. Disk drive indications 54A and 54B are merely symbolic of a number of disk drives that might be accommodated by the computer system. Typically, these would include a floppy disk drive such as 54A, a hard disk drive (not shown externally) and a CD ROM drive indicated by slot 54B. The number and type of drives vary, usually, with different computer configurations. The computer has the display 56 upon which information is displayed. A keyboard 60 and a mouse 62 are normally also available as input devices.

Figure 5:
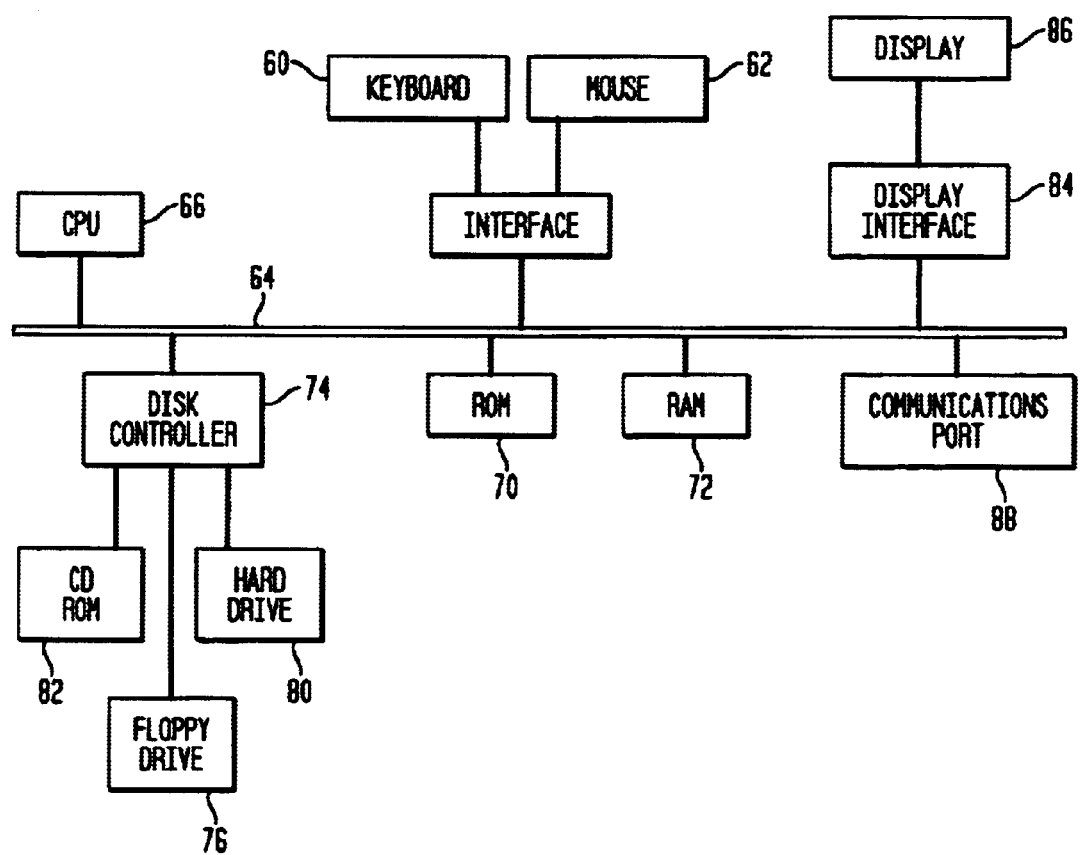
FIG. 5 is a block diagram of the computer system of FIG. 4.

FIG. 5 shows a block diagram of the internal hardware of the computer of FIG. 4. A bus 64 serves as the main information highway, interconnecting the other components of the computer. CPU 66 is the central processing unit of the system, performing calculations and logic operations required to execute programs. Read only memory 70 and random access memory 72 constitute the main memory of the computer. Disk controller 74 interfaces one or more disk drives to the system bus 64. These disk drives may be floppy disk drives, such as 76, internal or external hard drives, such as 80, or CD ROM or DVD (Digital Video Disks) drives, such as 82. A display interface 84 interfaces a display 86 and permits information from the bus to be viewed on the display. Communications with external devices can occur over communications port 88.

Figure 6:
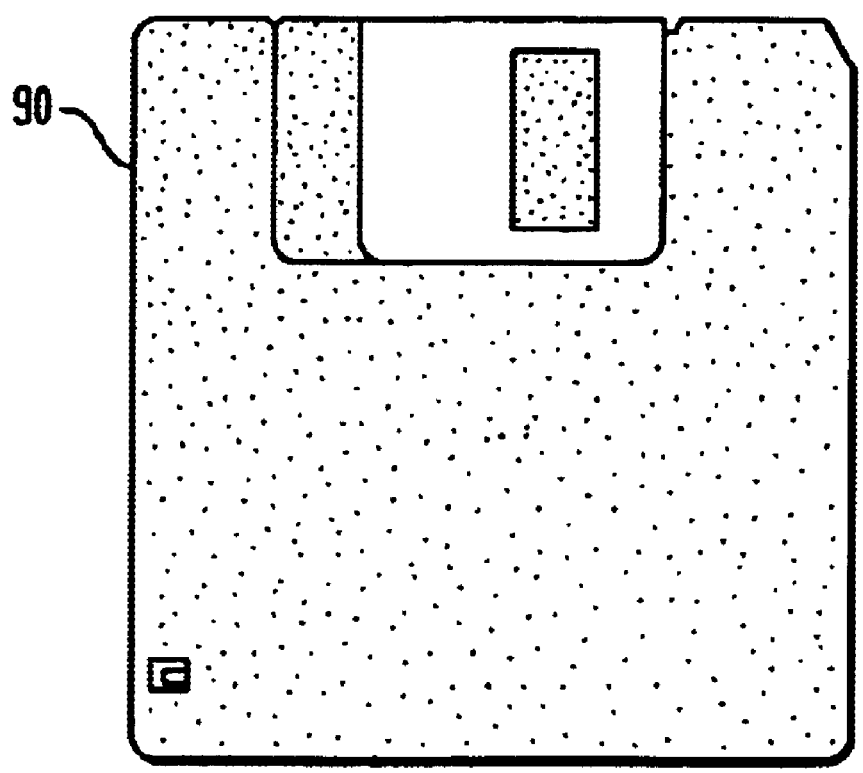
FIG. 6 shows a memory medium that can be used to hold a computer program for carrying out this invention.

FIG. 6 illustrates an exemplary memory medium 90 that can be used with drives such as 76 in FIG. 5 or 54A in FIG. 4. Typically, memory media such as a floppy disk, or a CD ROM, or a Digital Video Disk will contain the program information for controlling the computer to enable the computer to perform its functions in accordance with the invention.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of determining whether first and second byte streams are different, comprising the steps of:
    providing a first k1 byte long sequence of characters $c_i$ for i values from i=1 to k1;
    providing a second k2 byte long sequence of characters $c_j$ for j values from j=1 to k2;
    computing a modulo arithmetic operation on said i values, and computing said modulo arithmetic operation on said j values;
    computing a value N1 according to a formula that combines said modulo operation on i and each said character $c_i$ for i=1 to k1 using arithmetic or logical operations;
    computing a value N2 according to said formula by combining said modulo arithmetic operation on j and each said character $c_j$ for j=1 to j=k2; and
    determining, on a basis of a comparison of said N1 and N2 values, whether the first and second byte sequences are different.

2. A method according to claim 1, wherein the determining step includes the step of comparing the magnitude of the difference between said value N1 and said value N2 to determine the difference between said first and said second byte sequences.

3. A method according to claim 1, wherein:
    the step of computing a modulo arithmetic operation on said i values includes the step of computing the modulo arithmetic operation on said i values including additional arithmetic and logical bit operations; and
    the step of computing said modulo arithmetic operation on said j values includes the step of computing the modulo arithmetic operation on said j values including additional arithmetic and logical bit operations.

4. A method according to claim 1, wherein the determining step includes the step of comparing said N1 and N2 values to quantify approximately the magnitude of the difference between the first and second byte sequences.

5. A method according to claim 1, wherein:
    the step of computing the N1 value includes the step of computing the N1 value according to the equation:

$$N1 = \sum_{i=1}^{k} (c_i X OR(i\text{MOD}256)) \text{ and}$$

the step of computing the N2 value includes the step of computing the N2 value according to the equation:

$$N2 = \sum_{j=1}^{k} (c_j X OR(j\text{MOD}256)).$$

6. A computer system for determining whether first and second byte streams are different, comprising:
    means for providing a first k1 byte long sequence of characters $c_i$ for i values from i=1 to k1;
    means for providing a second k2 byte long sequence of characters $c_j$ for j values from j=1 to k2;
    means for computing a modulo arithmetic operation on said i values, and for computing said modulo arithmetic operation on said j values;
    means for computing a value N1 according to a formula that combines said modulo operation on i and each said character $c_i$ for i=1 to k1 using arithmetic or logical operations;
    means for computing a value N2 according to said formula by combining said modulo arithmetic operation on j and each said character $c_j$ for j=1 to j=k2; and
    means for determining, on a basis of a comparison of said N1 and N2 values, whether the first and second byte sequences are different.

7. A computer system according to claim 6, wherein the means for determining includes means for comparing the magnitude of the difference between said value N1 and said value N2 to determine the difference between said first and said second byte sequences.

8. A computer system according to claim 6, wherein:
    the means for computing a modulo arithmetic operation on said i values includes means for computing the modulo arithmetic operation on said i values including additional arithmetic and logical bit operations; and
    the means for computing said modulo arithmetic operation on said j values includes means for computing the modulo arithmetic operation on said j values including additional arithmetic and logical bit operations.

9. A computer system according to claim 6, wherein the means for determining includes means for comparing said N1 and N2 values to quantify approximately the magnitude of the difference between the first and second byte sequences.

10. A computer system according to claim 6, wherein:

the means for computing the N1 value includes means for computing the N1 value according to the equation:

$$N1 = \sum_{i=1}^{k}(c_i XOR(i MOD256))$$ and the means for computing the N2 value includes means for computing the N2 value according to the equation:

$$N2 = \sum_{j=1}^{k}(c_j XOR(j MOD256)).$$

11. A program storage device readable by machine, tangibly embodying a program of instructions executable by the machine to perform method steps for determining whether first and second byte streams are different, said method steps comprising:

providing a first k1 byte long sequence of characters $c_i$ for i values from i=1 to k1;

providing a second k2 byte long sequence of characters $c_j$ for j values from j=1 to k2;

computing a modulo arithmetic operation on said i values, and computing said modulo arithmetic operation on said j values;

computing a value N1 according to a formula that combines said modulo operation on i and each said character $c_i$ for i=1 to k1 using arithmetic or logical operations;

computing a value N2 according to said formula by combining said modulo arithmetic operation on j and each said character $c_j$ for j=1 to j=k2; and determining, on a basis of a comparison of said N1 and N2 values, whether the first and second byte sequences are different.

12. A program storage device according to claim 11, wherein the determining step includes the step of comparing the magnitude of the difference between said value N1 and said value N2 to determine the difference between said first and said second byte sequences.

13. A program storage device according to claim 11, wherein:

the step of computing a modulo arithmetic operation on said i values includes the step of computing the modulo arithmetic operation on said i values including additional arithmetic and logical bit operations; and the step of computing said modulo arithmetic operation on said j values includes the step of computing the modulo arithmetic operation on said j values including additional arithmetic and logical bit operations.

14. A program storage device according to claim 11, wherein the determining step includes the step of comparing said N1 and N2 values to quantify approximately the magnitude of the difference between the first and second byte sequences.

15. A program storage device according to claim 11, wherein:

the step of computing the N1 value includes the step of computing the N1 value according to the equation:

$$N1 = \sum_{i=1}^{k}(c_i XOR(i MOD256))$$ and the step of computing the N2 value includes the step of computing the N2 value according to the equation:

$$N2 = \sum_{j=1}^{k}(c_j XOR(j MOD256)).$$

16. A method according to claim 1, wherein the method is for detecting changes in a page of a document, and wherein the step of providing the first sequence of characters includes the step of using a defined procedure to determine the first sequence of characters from data in the page at a first time;

the step of providing the second sequence of characters includes the step of using the defined procedures to determine the second sequence of characters from data in the page at a second time; and the step of comparing said N1 and N2 values includes the step of comparing said N1 and N2 values to determine if the page is the same at both said first time and said second time.

17. A method according to claim 16, wherein said document is a computer data file.

18. A method according to claim 16, wherein said document is a website.

19. A method of monitoring for differences between pages of a web site, comparing the steps of:

reading first and second pages of the web site;

calculating a numeric representation for each of the pages, including the steps of:

(i) providing a first k1 byte long sequence of characters $c_i$ for i values from i=1 to k1 to represent the first page, (ii) providing a second k2 byte long sequence of characters $c_j$ for j values from j=1 to k2 to represent the second page, (iii) computing a modulo arithmetic operation on said i values, and computing said modulo arithmetic operation on said j values, (iv) computing a value N1 according to a formula that combines said modulo operation on i and each said character $c_i$ for i=1 to k1 using logical operations, and (v) computing a value N2 according to said formula by combining said modulo arithmetic operation on j and each said character $c_j$ for j=1 to j=k2; and using the N1 and N2 values to determine whether the first and second pages are different.

20. A method according to claim 19, wherein the step of using the N1 and N2 values includes the steps of:

determining a percentage difference between N1 and N2; and determining that the first and second pages are different if said percentage difference is more that a given value.

* * * * *